United States Patent
Bertrand et al.

(10) Patent No.: US 11,833,962 B2
(45) Date of Patent: Dec. 5, 2023

(54) VEHICLE HORN OPERATING DEVICE

(71) Applicant: Autoliv Development AB, Vargarda (SE)

(72) Inventors: Olivier Bertrand, Courcome (FR); Hugues Doursoux, Latille (FR); Thomas Letierce, Vouneuil s/Biard (FR)

(73) Assignee: Autoliv Development AB, Vargarda (SE)

( * ) Notice: Subject to any disclaimer, the term of this patent is extended or adjusted under 35 U.S.C. 154(b) by 115 days.

(21) Appl. No.: 17/594,853

(22) PCT Filed: Apr. 29, 2020

(86) PCT No.: PCT/EP2020/061829
§ 371 (c)(1),
(2) Date: Nov. 1, 2021

(87) PCT Pub. No.: WO2020/225043
PCT Pub. Date: Nov. 12, 2020

(65) Prior Publication Data
US 2022/0227293 A1    Jul. 21, 2022

(30) Foreign Application Priority Data

May 3, 2019    (FR) ..................... 1904677

(51) Int. Cl.
*B60Q 5/00* (2006.01)
*B62D 1/04* (2006.01)
(Continued)

(52) U.S. Cl.
CPC ............. *B60Q 5/003* (2013.01); *B62D 1/046* (2013.01); *H01H 3/38* (2013.01); *H01H 9/02* (2013.01);
(Continued)

(58) Field of Classification Search
CPC ......... H01H 2221/064; H01H 2223/01; H01H 2223/024; H01H 2227/032;
(Continued)

(56) References Cited

U.S. PATENT DOCUMENTS 6,908,102 B2    6/2005    Sugimoto
2004/0090052 A1    5/2004    Sugimoto
(Continued)

FOREIGN PATENT DOCUMENTS

DE    102015206367 A1    10/2016
EP    1669255 A1    6/2006
(Continued)

*Primary Examiner* — Anthony R Jimenez
(74) *Attorney, Agent, or Firm* — Foley & Lardner LLP

(57) ABSTRACT

The invention relates to a vehicle horn operating device comprising: a steering wheel skeleton structure, a support for a portion of an electric horn circuit comprising a first electrical contact point, an operating component comprising a second contact point, the operating component being able to move between a rest position and a depressed position; in the rest position, the second contact point is kept in contact with the first contact point by a spring element, the first contact point forming a first end stop for the operating component, wherein the device comprises—operating-component retaining elements arranged in such a way as to form a second end stop in the event of loading that causes the operating component to move beyond the first end stop.

15 Claims, 1 Drawing Sheet

(51) Int. Cl.
   *H01H 3/38*       (2006.01)
   *H01H 9/02*       (2006.01)
(52) U.S. Cl.
   CPC . *H01H 2225/012* (2013.01); *H01H 2227/028* (2013.01)
(58) Field of Classification Search
   CPC ....... H01H 2227/034; H01H 2231/026; H01H 2231/038; H01H 3/00; H01H 3/02; H01H 3/12; H01H 3/16; H01H 3/161; H01H 3/166; H01H 3/18; H01H 3/38; H01H 13/00; H01H 13/12; H01H 13/14; H01H 13/18; H01H 13/183; H01H 13/186; H01H 2003/00; H01H 2003/007; H01H 2003/02; H01H 2003/12; H01H 2003/16; H01H 2003/161; H01H 9/00; H01H 9/02; H01H 2225/012; H01H 2227/028; B62D 1/00; B62D 1/04; B62D 1/046; B62D 1/11; B62D 1/16; B62D 1/19; B60Q 5/00; B60Q 5/001; B60Q 5/003
   USPC ...................................................... 200/61.55
   See application file for complete search history.

(56) References Cited

U.S. PATENT DOCUMENTS

2006/0128187 A1    6/2006   Tsujimoto et al.
2021/0347299 A1*  11/2021   Groleau ................ H01H 13/52

FOREIGN PATENT DOCUMENTS

FR         3063942 A1   9/2018
KR     20080093632 A   10/2008
WO      2018/166974 A1   9/2018

* cited by examiner

[Fig. 1]
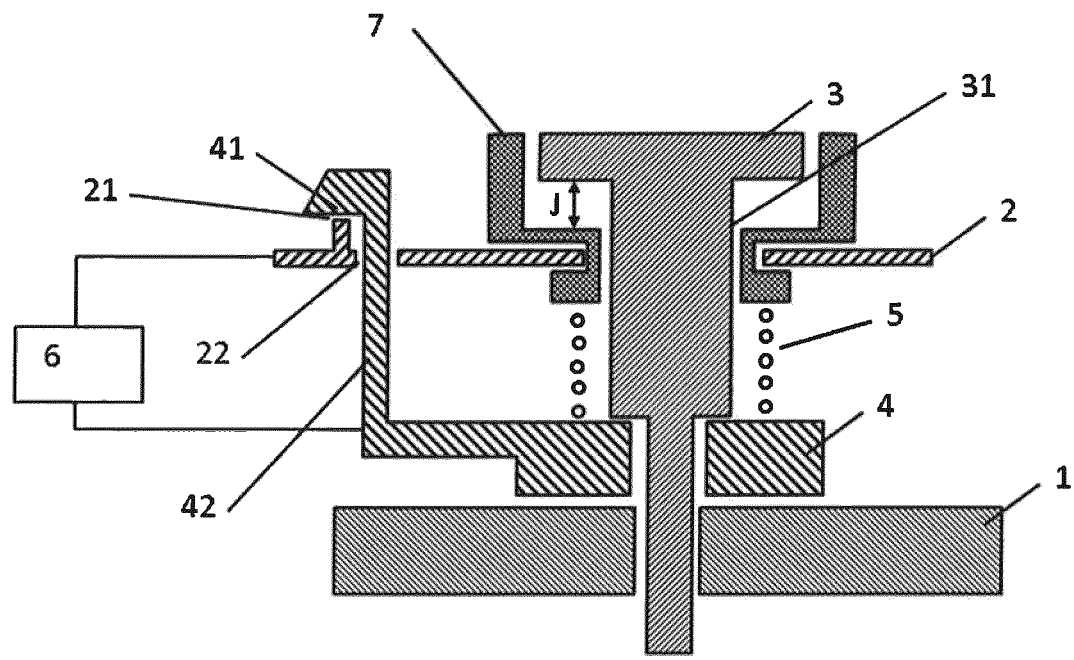
[Fig. 2]
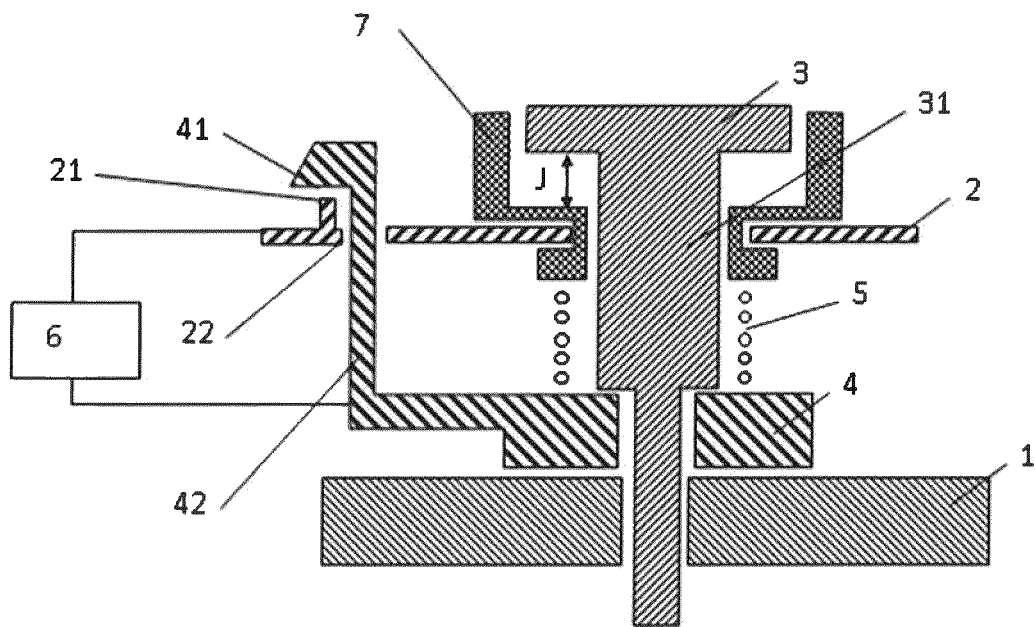

VEHICLE HORN OPERATING DEVICE

The invention relates to the field of vehicle horn operating devices and more particularly to those of the type located on the steering wheel.

Document FR3063942 describes a horn operating device, mounted on a vehicle steering wheel. The device comprises a base part, an operating component, movable between a rest position and a depressed position, resilient return means to push the operating component back to the rest position, an electrical circuit with at least one switch comprising a movable contact terminal on the operating component, and a static contact terminal on the base part. The device also includes stopping means from the rest position to the operating component. The stopping means also include the static contact terminal. According to this document, the contact points of the electrical circuit are positioned at the end stops. However, the end stops are not always positioned on the pressure zones that trigger the horn. This can affect the trigger sensitivity.

One aim of the present invention is to address the shortcomings of the above-mentioned prior art document and in particular to construct a horn operating device independent of the mode of retention or location of the operating component while still triggering when that part is slightly moved.

To do so, a first aspect of the invention relates to a vehicle horn operating device comprising, a steering wheel skeleton structure, a horn electrical circuit support comprising a first electrical contact point, an operating component comprising a second electrical contact point, the operating component being able to move relative to the steering wheel skeleton structure and the electrical circuit support between a rest position and a depressed position; in the rest position, the second contact point is kept in contact with the first electrical contact point by spring elements, the first contact point forming a first end stop for the operating component, characterized in that the horn operating device comprises retaining elements for the operating component which are arranged to form a second end stop in the event of additional mechanical loading that causes the operating component to move beyond the first end stop.

Thus, it is understood that the control device according to the invention ensures both a rapid triggering of the horn by opening the electrical circuit and a robust holding of the operating component onto the steering wheel skeleton structure even during heavy mechanical stresses such as the triggering of an airbag. Indeed, the operating component is typically arranged to receive an airbag. When the airbag is triggered, the forces are transmitted from the airbag to the skeleton structure via the operating component and then the second end stop. In other words, in the rest position, there is play between the operating component and the second end stop in an operating direction of the horn.

According to another embodiment, the device comprises an element securing the electrical circuit support to the steering wheel skeleton structure.

According to another embodiment, the device comprises a first guide element for guiding the operating component between a rest position and a depressed position.

According to another embodiment, the securing element of the electrical circuit and the first guide element of the operating component are jointly formed by a fastening screw.

In another embodiment, the fastening screw comprises the second end stop. The second end stop can be formed by a shoulder on the screw.

According to another embodiment, the electrical circuit support is kept between the steering wheel skeleton structure and the fastening screw. In other words, the electrical circuit support is kept on the skeleton structure by the screw.

According to another embodiment, the electrical circuit support is overmolded onto the horn electrical circuit.

In another embodiment, the operating component is electrically conductive and forms part of the horn electrical circuit. The operating component can be partly formed by a deep-drawn metal sheet, for example one of steel. Such a construction allows it to withstand the forces generated during airbag deployment.

In a further embodiment, an insulating element is arranged between the guide element and the operating component. The insulating element can be made of plastic, overmolded or clipped onto the operating component. The insulating element may be a ring which improves the guiding of the operating component.

According to another embodiment, the electrical circuit support comprises a second guide means for the operating component.

According to another embodiment, the electrical circuit support is fixed with respect to the steering wheel skeleton structure.

According to another embodiment, the circuit support is retained, for example by clipping, onto the operating component via the first contact point. This assembly allows a separate assembly of the sub-assembly formed by the circuit support and the operating component before securing this sub-assembly to the steering wheel skeleton structure.

According to another embodiment, the spring element is placed between the electrical circuit support and the operating component. This means that both ends of the spring are supported on the electrical circuit support and the operating component.

A second aspect of the invention relates to a vehicle steering wheel comprising a vehicle horn operating device according to the first aspect of the invention.

Other characteristics and advantages of the present invention will become more apparent upon reading the detailed description of an embodiment of the invention, which is provided by way of example but in no manner limited thereto, and illustrated by the attached drawings, in which:

FIG. 1 shows a sectional view of the horn operating device in the rest position;

FIG. 2 shows a sectional view of the horn operating device in the depressed position;

FIG. 1 shows a vehicle horn operating device mounted on a steering wheel comprising:
- an skeleton structure 1 of the steering wheel, forming a base part,
- a fastening screw 3, for example with a shoulder, attached to the skeleton structure 10 and forming a securing element
- a support 4 of a portion of an electric horn circuit comprising a first electrical contact point 41, the support 4 of a portion of an electric circuit is attached to the skeleton structure 1 by means of a securing element comprising, for example, the shouldered screw 3,
- a plate 2 comprising a second electrical contact point 21, guided by a cylindrical part 31 of the fastening screw 3,
- a spring 5 forming the spring or return element and bearing on the support 4 to push the plate 2 towards the first electrical contact point and the shoulder of the fastening screw 3. In other words, the spring element 5 is placed between the support 4 for a portion of the electric circuit and the operating component 2. This assembly allows the spring element 5 to be assembled outside the steering wheel, in the circuit support 4/plate 2 subassembly.

According to the invention, the first and second contact points 41 and 21 are placed opposite each other in the direction of movement of the plate 2.

The plate 2 is thus pushed upwards in FIG. 1 by the spring 5, so it is in a rest position, and the plate 2 can slide along the fastening screw 3 to reach a depressed position, as shown in FIG. 2. The plate 2 thus forms an operating component which can be pushed from the rest position of FIG. 1 to the depressed position of FIG. 2 by a user when he wants to honk.

In other words, the first electrical contact point 41 of the support 4 for a portion of the electric circuit forms a positioning element and in particular a first end stop, for positioning the plate 2 in a rest position, as it is pushed there by the spring 5.

According to the illustrated embodiment, the support 4 for a portion of the electric circuit comprises a straight portion 42 on which the plate 2 can slide or move between the rest position and the depressed position. For this purpose the plate 2 comprises a hole 22 wherein the straight portion 42 of the circuit support is mounted.

A safety module (airbag) can be mounted on the plate 2 and is pressed by the user to activate the horn. The safety module is therefore mounted on the plate 2 and can be moved relative to the steering wheel skeleton structure. However, in another embodiment, the operating component may be only a cover or a hood of the safety module. Typically, the operating component or plate 2 is arranged to receive an airbag, not shown, to which the driver can apply a force. The airbag may, for example, be clipped by means of hooks to one or more elastic rods attached to the plate 2.

In order to detect the movement of the plate 2, the invention proposes to form an electrical switch with the first electrical contact point 41 of the circuit support 4, which forms a static contact terminal, and the second electrical contact point 21 of the plate 2, which then forms a moving contact terminal.

An electric circuit is then formed by:
the support 4 for a portion of the electric circuit,
the static contact terminal, formed by the first electrical contact point 41 of the support 4,
the movable contact terminal, formed by the second electrical contact point 21 of the plate 2,
an electrical or electronic box 6 connected on the one hand to the circuit support and on the other hand to the plate 20, and which is arranged to detect the opening of the electrical circuit, i.e. the moment when the first contact point 41 is no longer in physical and/or electrical contact with the second contact point 21.

Advantageously, the fastening screw 3 is electrically insulated from the plate 2, for example by a washer 7 mounted between the plate 2 and the fastening screw 3.

Consequently, the detection of the command is carried out as soon as the plate 2 is moved, i.e. depressed, which affords very fast detection, and this makes it possible to limit the travel of the plate to very low values, i.e. lower than 1 mm. It is then possible to increase the stiffness of the spring 31 to limit the vibrations, because the stroke is small (so the spring force increases little along this small stroke).

In particular, it is possible to provide a stroke of less than or equal to 1 mm and preferably 0.5 mm, or even less than or equal to 0.3 mm. As a result, the clearance between the moving trim parts and the static trim parts of the steering wheel is smaller than in the prior art. In the prior art, about 4 mm of play can be observed, and the invention therefore makes it possible to reduce this play to values below 2 mm, which improves the quality perceived by the customer.

Alternatively, the play between the moving and static trim parts can be provided.

According to another embodiment of the invention, the support 4 for a portion of the electric circuit is mounted, for example, by clipping onto the plate 2. The assembly is carried out, for example, via the first contact point 41.

This facilitates the assembly of the horn system according to the invention. In fact, the support 4 for a portion of the electric circuit and the plate 2 can be assembled/clipped separately from the steering wheel. The sub-assembly 4/plate 2 is then screwed to the steering wheel skeleton structure 1 via the fastening screw 3.

According to the invention, the fastening screw 3 forms a retaining element of the plate 2 to constitute a second end stop if the plate 2 is subjected to a strong mechanical stress causing the plate 2 to move beyond the first end stop formed by the first electrical contact 42 of the support 4 for a portion of the electric circuit. This can happen, for example, when the airbag is deployed. The airbag module is mounted on the plate 2. When the bag is deployed, strong mechanical stresses are generated and transmitted to the plate 2 which then tends to move upwards in FIG. 1. To ensure that the plate 2 is held in place on the steering wheel skeleton structure 1, the shoulder of the fastening screw 3 acts as a second mechanical end stop for the plate. In other words, in the rest position, there is a play J between the shouldered head of the screw 3 and the plate 2 or a surface of the washer 7, this play being filled in only when a force greater than that/those applied by the spring(s) 5 on the plate 2 is applied. When such a force is applied to the plate 2, the first contact point 41 may be broken or deformed elastically or plastically.

According to another embodiment not shown, the second end stop could be formed independently of the fastening screw. Thus, a rigid part, for example a spacer, can be attached by one of its ends to the steering wheel skeleton structure 1 while the other end forms the second end stop.

Of course, several shoulder screws 3 (typically three) may be provided for guiding the plate 2, so as to form several positioning units or several end stop units, with the possibility of forming, more or less close to each end stop unit, a switch formed by a circuit support associated with a second electrical contact point formed on the board. All these switches can be placed in series, or in parallel of the same electric circuit with a single electronic box 53, or even provide an electric circuit for each switch of each end stop unit with an electronic box 6 to offer several options to trigger the horn: as soon as at least one switch is open, at least two switches open, or all the switches open.

Typically, the horn device will have three shouldered screws forming three second end stops and three or four second contact points 21, the second contact points 21 being supported by a single support 4 for a portion of the electric circuit. The second contact points 21 may be formed by conductive wires or conductive stamped plates crimped, clipped or overmolded onto the support 4.

It will be understood that various modifications and/or improvements which are obvious for the person skilled in the art may be made to the different embodiments of the invention described in this present description without departing from the scope of the invention.

The invention claimed is:

1. A vehicle horn operating device comprising:
   a steering wheel skeleton structure,
   a support forming a portion of an electrical horn circuit, the support comprising a first electrical contact point,
   an operating component comprising a second electrical contact point, the operating component being able to move relative to the steering wheel skeleton structure and the support between a rest position and a depressed position, wherein, in the rest position, the second contact point is kept in contact with the first electrical contact point by a spring element, the first contact point forming a first end stop for the operating component; and
   a fastener having a shoulder positioned to form a second end stop in the event of mechanical loading that causes the operating component to move beyond the first end stop.

2. The vehicle horn operating device according to claim 1 wherein the fastener secures the support to the steering wheel skeleton structure.

3. The vehicle horn operating device according to claim 1 wherein the first electrical contact point is overmolded on the support.

4. The vehicle horn operating device according to claim 1 wherein the operating component is electrically conductive and forms part of the electrical horn circuit.

5. The vehicle horn operating device according to claim 1 wherein the support guides the operating component between a rest position and a depressed position.

6. The vehicle horn operating device according to claim 1 wherein the support is fixed with respect to the steering wheel skeleton structure.

7. The vehicle horn operating device according to claim 1 wherein the spring element is placed between the support for a portion of the electric circuit and the operating component.

8. The vehicle horn operating device according to claim 1 in combination with a vehicle steering wheel.

9. The vehicle horn operating device according to claim 1, wherein the fastener guides the operating component between the rest position and the depressed position.

10. The vehicle horn operating device according to claim 9 wherein an insulating element is placed between the fastener and the operating component.

11. The vehicle horn operating device according to claim 9, wherein the fastener passes through the support and the operating component.

12. The vehicle horn operating device according to claim 11, wherein the fastener comprises a fastening screw.

13. The vehicle horn operating device according to claim 12 wherein the support is held between the steering wheel skeleton structure and the fastener.

14. The vehicle horn operating device according to claim 1, wherein the support is clipped onto the operating component.

15. The vehicle horn operating device according to claim 14 wherein the support is clipped to the operating component via the first contact point.

* * * * *